March 31, 1953    J. W. CWYNAR ET AL    2,633,365
CONVERTIBLE WHEEL AND SKI SCOOTER AND SLED
Filed Aug. 3, 1949    3 Sheets-Sheet 1

INVENTORS
JOHN W. CWYNAR
and GEORGE E. GELFAND
BY Edwin Levisohn +
Harry Cohn
ATTORNEYS.

March 31, 1953 J. W. CWYNAR ET AL 2,633,365
CONVERTIBLE WHEEL AND SKI SCOOTER AND SLED
Filed Aug. 3, 1949 3 Sheets-Sheet 2
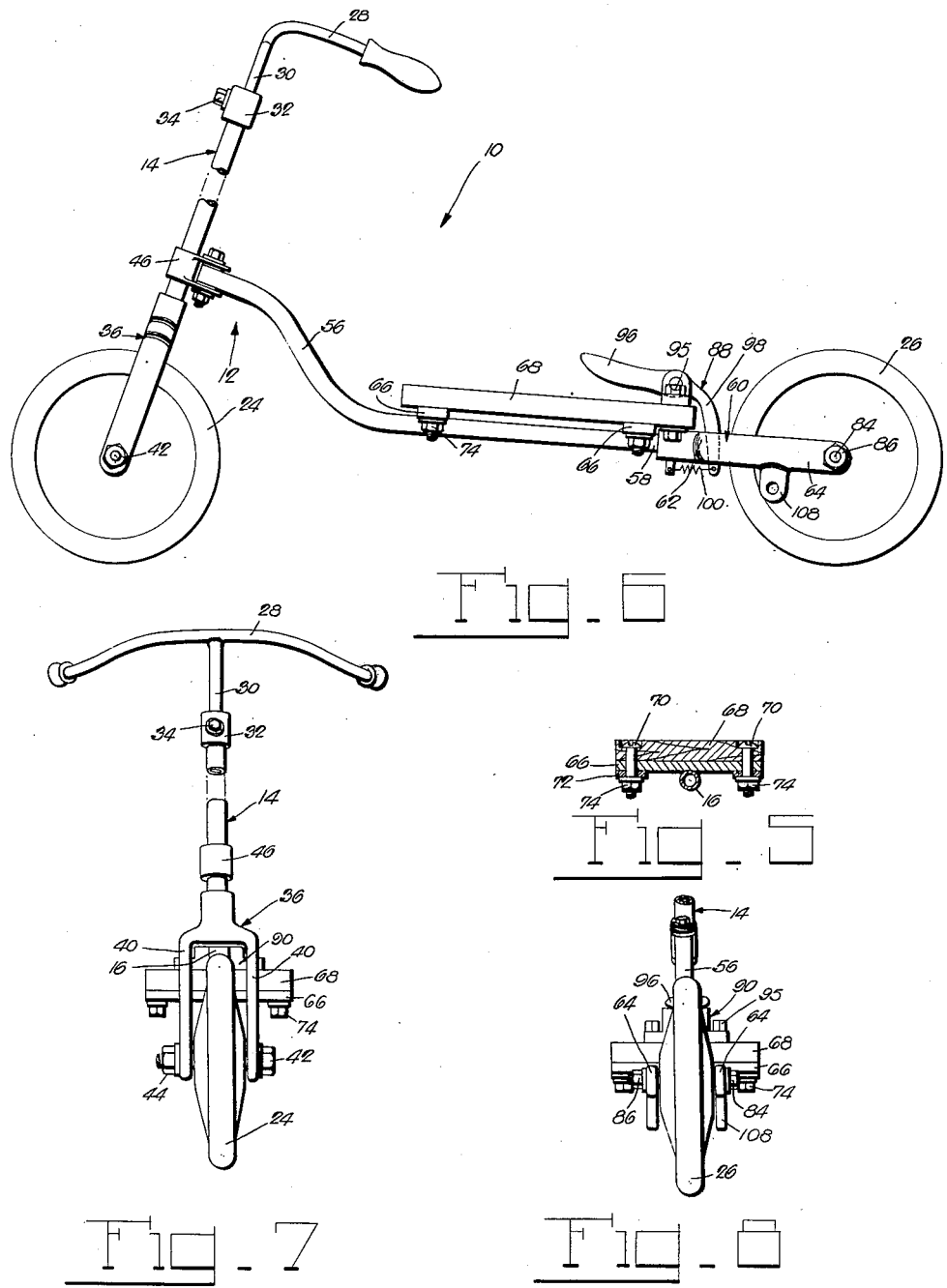
INVENTORS
JOHN W. CWYNAR and GEORGE E. GELFAND
BY Edwin Levisohn + Harry Cole
ATTORNEYS.

March 31, 1953 J. W. CWYNAR ET AL 2,633,365
CONVERTIBLE WHEEL AND SKI SCOOTER AND SLED
Filed Aug. 3, 1949 3 Sheets-Sheet 3
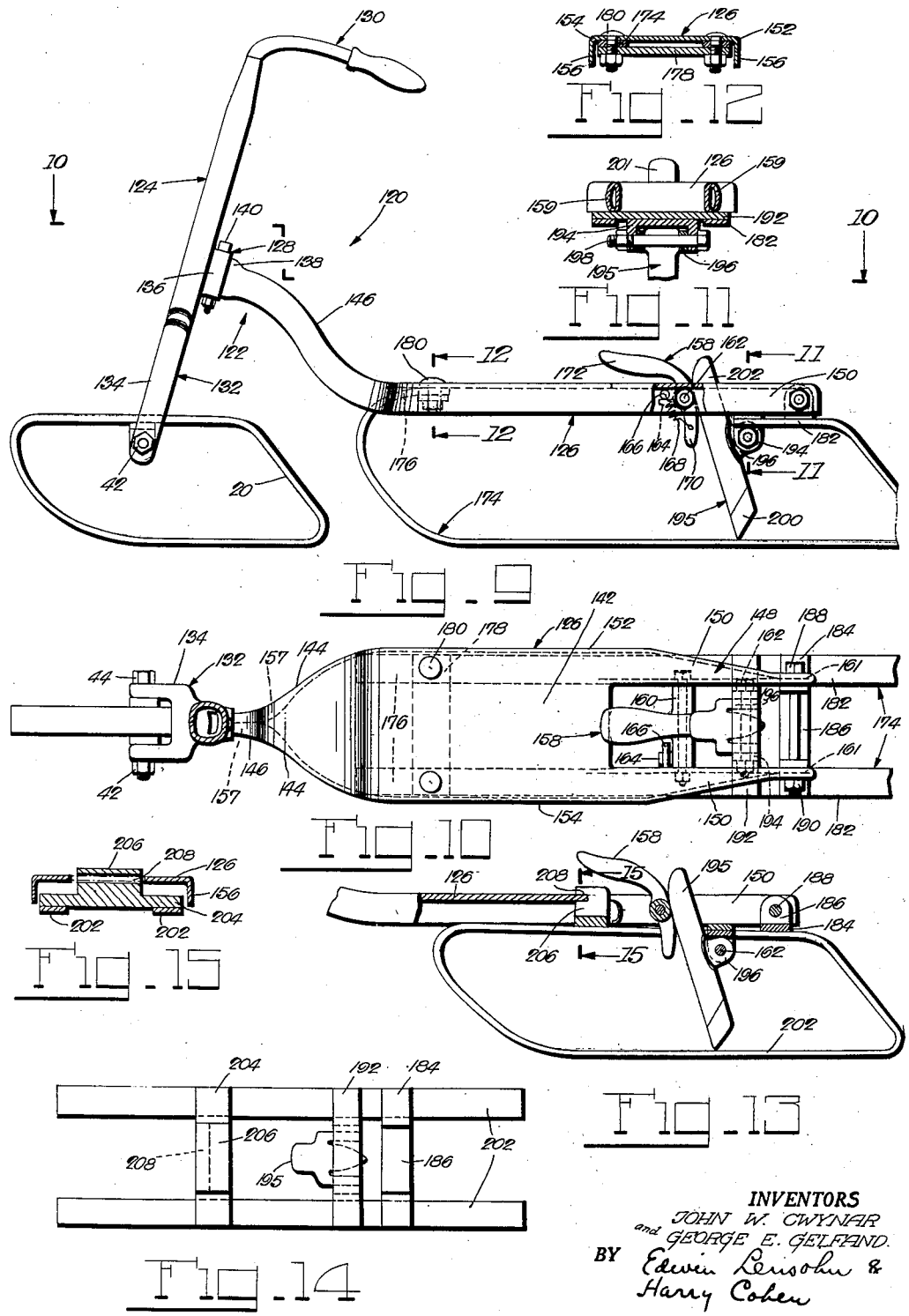
INVENTORS
JOHN W. CWYNAR
and GEORGE E. GELFAND.
BY Edwin Lensohn &
Harry Cohen
ATTORNEYS.

Patented Mar. 31, 1953

2,633,365

UNITED STATES PATENT OFFICE 2,633,365

CONVERTIBLE WHEEL AND SKI SCOOTER AND SLED

John W. Cwynar and George E. Gelfand, Scranton, Pa.

Application August 3, 1949, Serial No. 108,310

3 Claims. (Cl. 280—16.)

This invention relates to a combination wheel and ski scooter and coaster.

An object of this invention is to provide a scooter and coaster which is readily convertible for use either on the ground or on snow and ice.

Another object is to provide a frame of improved construction and design for a combination wheel and ski scooter, said frame being provided with brake means readily convertible for use in connection with the travel of said scooter over the ground or on snow and ice, and with means which serve as axles for the wheels or retainers for the skis.

The above and other objects, features and advantages of the present invention will be fully understood from the following description considered in connection with the accompanying illustrative drawings.

In the drawings:

Fig. 5 is a sectional view taken on line 5—5 of Fig. 1;

Fig. 6 is a view similar to Fig. 1 showing the scooter equipped with wheels;

Fig. 7 is a front view of the scooter illustrated in Fig. 6;

Fig. 8 is a rear view of the scooter illustrated in Fig. 6, a part thereof being omitted;

Fig. 9 is a side view of the scooter illustrating another embodiment of the present invention;

Fig. 10 is a top plan view of the scooter illustrated in Fig. 9, part thereof being omitted;

Fig. 11 is a sectional view taken on line 11—11 of Fig. 9;

Fig. 12 is a sectional view taken on line 12—12 of Fig. 9;

Fig. 13 is a fragmentary side elevation, partly in section, of the scooter with a modified rear runner;

Fig. 14 is a top plan view of the runner illustrated in Fig. 13; and

Fig. 15 is a sectional view taken on line 15—15 of Fig. 13.

Figure 1:
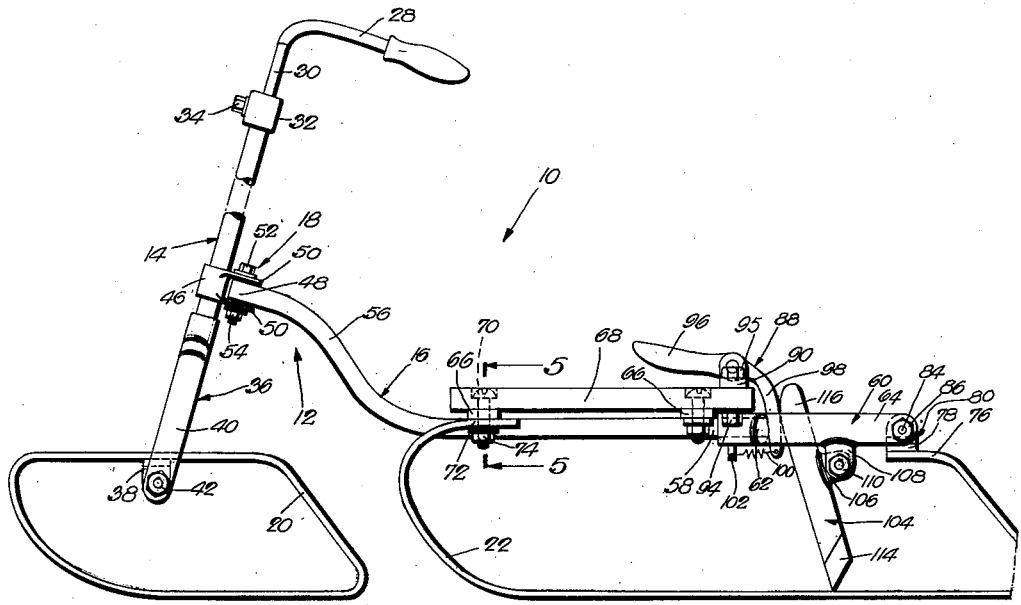
Fig. 1 is a side view of a scooter, according to the present invention, equipped with runners.
Figure 2:
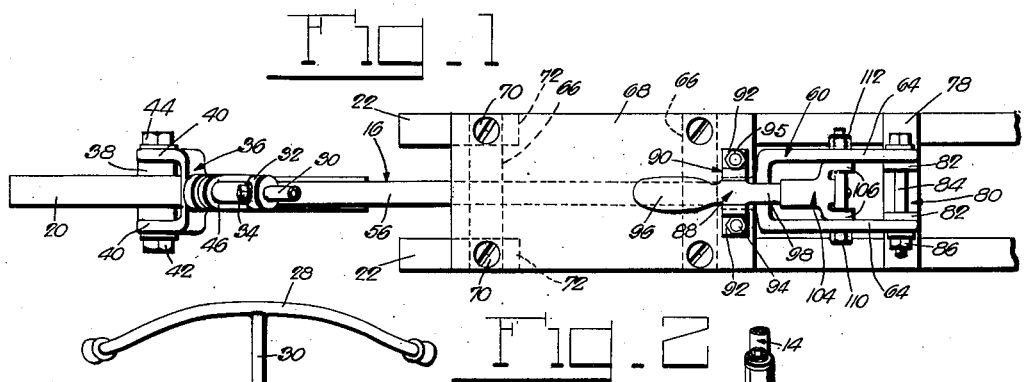
Fig. 2 is a top plan view of the scooter, part thereof being omitted.

In the drawings, there is illustrated a vehicle 10 of the kind which, generally, is propelled when the operator stands with one foot thereon and pushes the other foot against the surface over which he is traveling, said vehicle being commonly known as a scooter, said vehicle also being used at times to coast down an inclined surface. In its presently preferred embodiment, vehicle 10 comprises a frame 12 having a frontal steering column 14 and a rear part 16 which is pivotally connected at its front end to said column as at 18. Said frame 12 is provided with support members in the form of the front runner 20 and the rear runners 22 to constitute a ski scooter, as illustrated in Figs. 1 through 4, or said support members may be in the form of front and rear wheels 24 and 26, respectively, to constitute a wheel scooter as illustrated in Figs. 6, 7, and 8. It will be noted that the ski-runners 20 and 22 are preferably loop-shaped.

Figures 3, 4:
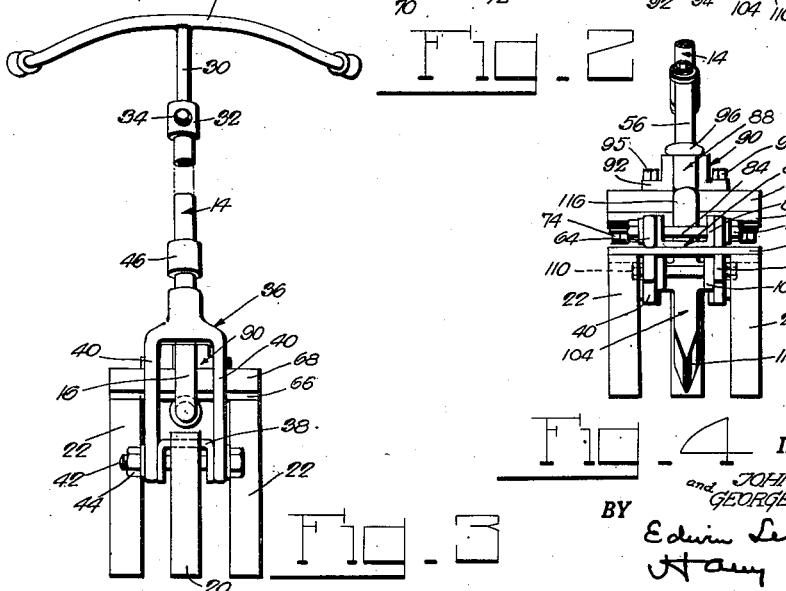
Fig. 3 is a front view of the scooter.
Fig. 4 is a rear view of the scooter, part thereof being omitted.

Referring now to Figs. 1 through 4, the steering column 14 is preferably a metallic tubular member or rod and, as here shown, is provided with handle bars 28 carried by a part 30 which is slidably disposed within the upper end of said column, a collar 32 being carried by the column at its upper end, and said collar being provided with a bolt 34 releasably engageable with said part for retaining the handle bars in adjusted position longitudinally of said column. At its lower end, the steering column is securely fixed in a downwardly extending bifurcated holder 36. The front runner or ski 20 is provided with an inverted U-shaped bracket 38, the bight of which is preferably welded, or secured in other suitable manner, to the inner surface of the upper horizontal portion thereof. It will be understood that bracket 38 is so dimensioned that it will clamp between the downwardly extending legs 40 of the bifurcated holder 36, as illustrated in Fig. 3, said bracket being releasably secured in the holder, at the free ends thereof, by a bolt 42 which is inserted therethrough and is provided with a nut 44 for securely and releasably affixing the front runner in position between the legs of said bifurcated holder. The steering column is also provided with a collar 46 which is securely affixed thereon and constitutes one portion of the pivot 18, the rear frame part 16 being provided at one end with an apertured portion 48 which is disposed between the spaced apertured extensions 50 carried by collar 46, a bolt 52 extending through the aligned apertures in said extensions and in said portion, said bolt being secured in position by a nut 54, and said frame portion being pivotal about said bolt.

From the front end portion 48, the rear frame part 16 curves downwardly, as at 56, and extends rearwardly of the front steering column, said rear frame part being constituted preferably by a single tubular metallic member or rod provided at its rear end 58 with a rearwardly extending bifurcated holder 60. Said holder is provided with a sleeve 62 into which the end 58 is securely affixed, as by welding or in any other suitable manner, the legs 64 of said bifurcated member extending in a horizontal plane rearwardly of said rear frame part. Said rear frame part is also provided with the spaced transverse straps 66, welded or otherwise suitably secured thereto. A platform or running board 68, preferably formed of wood or other suitable material, is secured to each end of said straps by bolts 70 countersunk therein, said platform being thereby positioned in a substantially horizontal plane and being centered on said rear frame. Two rear skis or runners 22 are provided for said rear frame part, the upper front reflexed portion 72 of said skis being secured to the lower surface of the front strap 66 by said bolts 70 and nuts 74, as shown in Fig. 5. The upper rear reflexed portions 76 of said rear runners are united by a transverse strap 78, said strap being provided with a U-shaped bracket 80 the cross bar of which is welded or otherwise secured to said strap. It will be understood that bracket 80 is so dimensioned that the upstanding arms 82 thereof clamp between the free ends of legs 64 of the bifurcated holder 60, said bracket being releasably secured therebetween by bolt 84 and nut 86.

As a brake for the ski skooter, there is provided a bell crank lever 88 which is pivotally secured in a mounting part 90 provided with the flanged portions 92 which are secured by bolts 94 and nuts 95 to the rear end of platform 68. Said lever is provided with a foot-pedal 96, which overlies the platform, and with a portion 98 which is spaced rearwardly of the platform and extends downwardly between the legs 64 of the bifurcated holder 60. A spring 100 is secured between the free end of portion 98 and a pin 102 which projects downwardly from the sleeve 62, said spring biasing lever 88 to a retracted position. A brake part 104 is provided with integral spaced and apertured ears 106, said ears abutting the inner surfaces of the apertured integral projections 108 depending from legs 64 of the bifurcated holder 60, said brake part being mounted for pivotal movement between said legs by a bolt 110 extending through said ears and said projections and secured by a nut 112. Brake part 104 is provided at its lower end with a spur 114. It will be noted from Fig. 1 that in the retracted, or normal, position of lever 88, portion 98 thereof is biased by spring 100 into abutment with the bifurcated holder 60 at a point on the cross part thereof substantially intermediate legs 64 and that the brake part 104 is pivoted on bolt 110 to a position wherein an upper portion 116 thereof is disposed on portion 98 and spur 114 is positioned above the bottom surface of the runners (see Fig. 4). It will be apparent that when pedal 96 is stepped upon, lever 88 will pivot in its mounting 90 so that the downwardly extending portion 98 will be rocked upwardly against the bias of spring 100 whereby the upper end 116 of brake part 104 will be rotated thereby in a clockwise direction, viewing Fig. 1, thus causing spur 114 to also move in a clockwise direction and in the direction of travel of the vehicle whereby it is forced into the snow or ice to brake the travel of the ski skooter.

When it is desired to convert the vehicle 10 from a ski skooter for use on snow or ice, into a wheel scooter for use on the ground, the front runner or ski 20 is easily removed by unscrewing nut 44 and withdrawing bolt 42 to disengage said runner from the bifurcated holder 36. In the same manner, the rear runners or skis 22 are both removed by removing nut 86 from bolt 84 and then withdrawing the bolt from the bifurcated holder 60 and the bracket 80, the front ends of said rear runners being removed by removing the nuts 74 from the bolts 70 in the front strap 66 and thereafter removing the runners from said bolts and then replacing the nuts on bolts 70. The brake member 104 is also removed from the projections 108 by unthreading the nut 112 and removing bolt 110. The frame is now prepared for conversion into a wheel scooter. This is accomplished by positioning the front wheel 24 between the legs 40 of the bifurcated holder 36, reinserting bolt 42 through said parts and the wheel, and then securing said bolt by means of the nut 44, the bolt now serving as a front axle upon which wheel 24 is freely rotatable. In the same manner, the rear wheel 26 is positioned between the legs 64 of the rear bifurcated holder 60 and the bolt 84 is reinserted into said legs, and through said wheel, and secured therein by the nut 86, bolt 84 now serving as a rear axle for the wheel 86, said wheel being freely rotatable thereon. It will be noted from Figs. 7 and 8 that both of said wheels are provided with side portions which extend laterally on both sides of the longitudinal axis of the wheel to take up most of the space between the legs of the respective bifurcated holders 36 and 60 whereby the wheels, although freely rotatable on the bolts extending between the arms of said holders, are not laterally movable thereon. The lever 88 now serves as the complete brake mechanism for the wheel scooter, it being apparent that when pedal 96 is depressed, the downwardly extending part 98, which is biased for normal disengagement with wheel 26 will be projected against the bias of spring 100 to engage the periphery of said wheel for braking the wheel scooter. All the other parts of the ski skooter remain unchanged when it is converted into the wheel scooter.

It will be apparent that the conversion of the vehicle from a ski skooter into a wheel scooter, or vice versa, can be accomplished in a very short time and without requiring any special tools or additional parts in view of the fact that the bolts 42 and 86, in addition to securing the front and rear runners in position, also serve as the front and rear axles for the front and rear wheels, respectively. Furthermore, it will be apparent that said change can be accomplished without difficulty even by a child since, in addition to replacing the wheels as stated, it only requires the removal of the bolts 70 from the front strap 66 in order to remove the front ends of the rear runners and the removal of bolt 110 in order to remove the brake part 104, both of these operations being quite simple.

Another embodiment of our invention is illustrated in Figs. 9 through 12 wherein vehicle 120 comprises a frame 122 having a front steering column 124 and a platform 126 pivotally connected at its front end to said column, as at 128. Said steering column 124 is preferably a tubular member and is preferably formed of stamped or pressed metal, the upper part thereof being provided with handle bars 130, welded or otherwise suitably secured thereto. At its lower end, the steering column is formed into a downwardly extending bifurcated portion 132 which serves as the holder for the front support member. It will be understood that the front support member, whether in the form of the previously described runner 20 or wheel 24, is releasably mounted between the legs 134 of bifurcation 132, in the same manner as previously described, by bolt 42 and nut 44. The steering column is also provided with the struck-out portion 136 which constitutes one portion of the pivot 128, platform 126 being provided at its front end with an apertured portion 138 which is pivotally disposed in portion 136 by bolt 140.

Platform 126 is preferably formed of stamped or pressed metal and is provided with a wide portion 142 which, if preferred, can be provided with a rubber mat, and which tapers inwardly as at 144, to form the narrow front portion 146 which curves upwardly and is provided with the apertured part 138 pivotally secured to the steering column. Said platform is also formed with a rearwardly extending bifurcated holder portion 148, the outer sides of legs 150 of said portion tapering inwardly from the marginal side edges 152 and 154 of the platform. Said platform is provided with depending flanges 156, which are bent-under to form abutting tubular parts 157 in the narrowed portion 146, as shown by the broken lines in Fig. 10, said flanges also being bent-under at legs 150 to form tubular parts 159, as illustrated in Fig. 11, said tubular parts being flattened at the free ends of said legs, as at 161. A bell crank lever 158 is provided with a transverse sleeve 160 which is pivotally mounted between legs 150 by bolt 162. Said sleeve is provided with a lug 164 which co-operates with a detent pin 166 extending inwardly from one of said legs, a spring 168 connected between said pin and depending lever part 170 normally biases said lever to a retracted position in which the lug abuts the pin. It will be apparent that when the pedal 172 of the lever is depressed, depending portion 170 thereof will be pivoted in a counter-clockwise direction, viewing Fig. 9, against the bias of the spring, to a projected position, as hereinafter more fully described.

Two rear skis or runners 174 are releasably secured to the platform, the upper front reflexed portions 176 of said skis being joined by a strap 178 secured thereto in a suitable manner and said reflexed portions being removably secured to said platform between the depending flanges 156 by through-bolts 180 which also extend through strap 178. The upper rear reflexed portions 182 of said rear runners are united by a transverse strap 184, said strap being provided with a U-shaped bracket 186, the cross bar of which is welded or otherwise secured to said strap. It will be understood that bracket 186 is so dimensioned that the upstanding arms thereof clamp between the free ends of legs 150 of the bifurcation 148, said bracket being releasably secured therebetween by bolt 188 and nut 190. At the free ends of said rear reflexed portions 182, the runners are united by a transverse strap 192 secured thereto in a suitable manner. An inverted U-shaped bracket 194 is secured, in a suitable manner, to strap 192 between the runners. It will be understood that runners 174 are maintained in spaced, parallel disposition by said straps. A brake part 195 is provided with integral spaced and apertured ears 196, said ears being mounted between the depending arms of said bracket for pivotal movement on a bolt 198 extending through said arms and said ears.

Brake part 195 is provided at its lower end with a spur 200. It will be noted from Fig. 9 that in the retracted position of lever 158, the upper portion 201 of said brake part abuts said lever so that the spur is raised above the surface on which the runners are disposed. It will be apparent that when pedal 172 is depressed, the depending part 170 will be rocked upwardly to rotate part 195 in a clockwise direction, viewing Fig. 9, thus causing spur 200 to be forced into the snow or ice to brake the travel of the ski scooter.

The runners 174 are readily removable by removing both bolts 180 and bolt 188, it being noted that it is not necessary to separately remove brake part 195 since said part is carried by the runners. Rear wheel 26 can now be inserted between legs 150 using bolt 188 as the axle for said wheel, as previously described. The front runner 20 is readily removable and replaceable by front wheel 24, as previously described. It will be understood that lever 158 will brake the rear wheel in the same manner as described with reference to Fig. 6.

Another type of rear runner is illustrated in Figs. 13, 14 and 15, a pair of said runners 202 being removably mounted between the free ends of legs 150, in the same manner as runners 174 and being provided with a similar brake part 195. It will be noted that each runner 202 is continuous, having its ends mutually secured in any suitable manner. Runners 202 are provided with a cross member 204, secured thereto in a suitable manner, forwardly of strap 192 on which brake part 195 is mounted. Said cross-member is provided with an integral bifurcated anchoring device or hook 206 provided with the groove or recess 208. A rear marginal edge portion of platform 126, between the legs 150 thereof, is releasably engaged in said groove, as shown in Fig. 13, for anchoring the forward portions of runers 202 to said platform. It will be apparent that runners 202 may be readily removed from the vehicle by simply withdrawing bolt 188, which becomes the axle for the rear wheel, and by disengaging said hook from the platform.

While we have shown and described the presently preferred embodiments of our invention, it will be understood that various changes in the details of construction and in the form and arrangement of parts may be made without departing from the underlying idea or principles of this invention within the scope of the appended claims.

Having thus described our invention, what we claim and desire to secure by Letters Patent, is:

1. In a scooter having a frame comprising a steering post provided with downwardly extending laterally spaced legs, an axle member positioned between said legs, front runner means positioned between said legs and provided with mounting means removably secured to said axle, a rear frame member pivotally connected to said steering post and provided with rearwardly extending laterally spaced legs, a second axle member mounted between said last mentioned spaced legs, a pair of loop shaped rear runners provided with spaced transverse members for maintaining said rear runners in spaced parallel disposition, one of said members having a part removably secured to said second axle, another of said members being removably secured to said rear frame member substantially forwardly of said rearwardly extending spaced legs, said rear runners being peripherally interrupted at the upper marginal portions thereof, an additional transverse member interconnecting said rear runners rearwardly of said interruption and forwardly of said part removably secured to said second axle, and a foot brake comprising a surface engaging part having means for pivotally mounting said last mentioned part between said rearwardly extending spaced legs on said additional transverse member.

2. In a scooter having a frame comprising a steering post provided with downwardly extending laterally spaced legs, an axle member positioned between said legs, front runner means positioned between said legs and provided with mounting means removably secured to said axle, a rear frame member pivotally connected to said steering post and provided with rearwardly extending laterally spaced legs, a second axle member mounted between said last mentioned spaced legs, a pair of loop shaped rear runners provided with spaced transverse members for maintaining said rear runners in spaced parallel disposition, one of said members having a part removably secured to said second axle, another of said members being removably secured to said rear frame member substantially forwardly of said rearwardly extending spaced legs, said rear runners being peripherally interrupted at the upper marginal portions thereof, an additional transverse member interconnecting said rear runners rearwardly of said interruption and forwardly of said part removably secured to said second axle, and a foot brake comprising an operating part pivotally mounted to said rear frame member remote from said steering post between said rearwardly extending spaced legs and a surface engaging part pivotally mounted on said additional transverse member between said rearwardly extending spaced legs, said latter part abutting said operating part and being pivoted into surface engagement by said operating part.

3. In a device of the character described having a frame comprising a steering post provided with downwardly extending laterally spaced legs, front runner means removably positioned between said legs, a rear frame member pivotally connected to said steering post and provided with rearwardly extending laterally spaced legs, a pair of rear runners secured together in spaced parallel disposition, spaced transverse members for maintaining said rear runners in spaced parallel disposition, said transverse members having means for mounting said rear runners to said rear frame member, an additional transverse member interconnecting said rear runners intermediate said spaced transverse members, and a foot brake comprising a surface engaging part having means for pivotally mounting said last mentioned part between said rearwardly extending spaced legs on said additional transverse member.

JOHN W. CWYNAR.
GEORGE E. GELFAND.

REFERENCES CITED

The following references are of record in the file of this patent:

UNITED STATES PATENTS

| Number | Name | Date |
|---|---|---|
| 327,227 | Bronson | Sept. 29, 1885 |
| 505,831 | Hopkins | Oct. 3, 1893 |
| 989,395 | Nelson | Apr. 11, 1911 |
| 1,209,398 | Converse | Dec. 19, 1916 |
| 1,240,226 | Kunst | Sept. 18, 1917 |
| 1,477,513 | McNeill | Dec. 11, 1923 |
| 1,558,338 | Brooks | Oct. 20, 1925 |
| 1,652,049 | Roberts | Dec. 6, 1927 |
| 1,663,060 | Rainey | Mar. 20, 1928 |
| 1,676,159 | Roth | July 3, 1928 |
| 2,316,272 | Meyer | Apr. 13, 1943 |
| 2,460,395 | Reid | Feb. 1, 1949 |
| 2,486,689 | Tibores et al. | Nov. 1, 1949 |